US006913136B2

(12) United States Patent
van den Dungen et al.

(10) Patent No.: US 6,913,136 B2
(45) Date of Patent: Jul. 5, 2005

(54) APPARATUS AND METHOD FOR POSITIONING SEPARATELY SUPPLIED ELONGATE MEAT PRODUCTS

(75) Inventors: Wilhelmus Johannes Everardus Maria van den Dungen, Veghel (NL); Johannes Theodorus Antonius Andreas van Donzel, Oss (NL); Wilhelmus Josephus Maria Manders, Boekel (NL)

(73) Assignee: Townend Engineering Company, Des Moines, IA (US)

( * ) Notice: Subject to any disclaimer, the term of this patent is extended or adjusted under 35 U.S.C. 154(b) by 0 days.

(21) Appl. No.: 10/642,800

(22) Filed: Aug. 18, 2003

(65) Prior Publication Data

US 2004/0038637 A1 Feb. 26, 2004

Related U.S. Application Data

(60) Provisional application No. 60/416,801, filed on Oct. 8, 2002.

(30) Foreign Application Priority Data

Aug. 22, 2002 (NL) .............................................. 1021317

(51) Int. Cl.⁷ .............................................. B65G 37/00
(52) U.S. Cl. ........................ 198/620; 198/389; 198/415; 198/623
(58) Field of Search .................... 198/389, 382, 198/396, 415, 620, 623, 626.2, 626.3

(56) References Cited

U.S. PATENT DOCUMENTS

| 2,745,453 A | * | 5/1956 | Perrelli et al. ................. 99/550 |
| 3,339,625 A | * | 9/1967 | Scherrer ....................... 164/432 |
| 3,462,001 A | * | 8/1969 | Boyce .......................... 198/415 |
| 3,768,627 A | * | 10/1973 | Anderson ..................... 198/383 |
| 3,774,749 A | * | 11/1973 | Tobey et al. .................. 198/415 |
| 3,880,274 A | * | 4/1975 | Bechtloff et al. ........ 198/626.2 |
| 4,085,839 A | * | 4/1978 | Crawford ..................... 198/410 |
| 4,337,633 A | * | 7/1982 | Logue ............................ 72/94 |
| 4,421,222 A | * | 12/1983 | Stuermer ..................... 198/382 |
| 4,464,884 A | * | 8/1984 | Franks ......................... 53/557 |
| 4,590,643 A | * | 5/1986 | Hill ............................. 452/112 |
| 4,676,361 A | * | 6/1987 | Heisler ........................ 198/394 |
| 4,705,159 A | * | 11/1987 | Feliks et al. .............. 198/468.8 |
| 4,747,480 A | * | 5/1988 | Wedler et al. ............... 198/396 |
| 5,052,543 A | * | 10/1991 | Hagan ......................... 198/387 |
| 5,115,903 A | * | 5/1992 | Leander ....................... 198/400 |
| 5,201,398 A | | 4/1993 | Clugston |
| 5,871,080 A | * | 2/1999 | Manzi et al. ................ 198/396 |
| 6,135,263 A | * | 10/2000 | Williams ..................... 198/396 |
| 6,205,751 B1 | * | 3/2001 | Kammler et al. .............. 53/473 |
| 6,241,079 B1 | * | 6/2001 | Weber et al. ................ 198/817 |
| 6,268,004 B1 | * | 7/2001 | Hayashi ....................... 426/496 |
| 6,331,104 B1 | * | 12/2001 | Kobussen et al. ........ 425/133.1 |

FOREIGN PATENT DOCUMENTS

JP              611111221        5/1986

\* cited by examiner

*Primary Examiner*—Douglas Hess

(57) ABSTRACT

A device for positioning separately supplied elongate meat products, comprises two driven endless aligning conveyors running with the transport paths substantially parallel to each other, which transport paths together form a support for the meat products for transporting such that, at the position where the transport paths are mutually adjacent, they are in a lower position than when at a greater mutual distance. This structure also relates to a method for positioning separately supplied elongate meat products.

17 Claims, 3 Drawing Sheets

APPARATUS AND METHOD FOR POSITIONING SEPARATELY SUPPLIED ELONGATE MEAT PRODUCTS

CROSS REFERENCE TO RELATED APPLICATIONS

This application claims the benefit of U.S. Provisional Application No. 60/416,801, filed Oct. 8, 2002, which claims foreign priority of Netherlands Application No. 1021317, filed Aug. 22, 2002.

FIELD OF THE INVENTION

The invention relates to a device and method for positioning a plurality of meat products supplied in line in different orientations, such as particularly sausages and semi-manufactures of sausages.

BACKGROUND OF THE INVENTION

During the manufacture of meat products on industrial scale it is usual to transport the (half-) products between different processing stations by means of conveyor belts, conveyor chains and the like. For a relatively simple processing of the (half-) products it is advantageous when they are supplied in position to a subsequent processing station. More in particular it is advantageous when the elongate meat products are oriented axially in the direction of transport, i.e. lying successively one behind the other (with optionally greater or smaller interspacing) in longitudinal direction. An important limitation in the positioning is that the elongate meat products are usually vulnerable. Semi-manufactures of sausages can thus often have such little firmness that they deform or are damaged by local contact. It will be apparent that damage and deformation of the meat products is undesirable.

Such a positioning is known from JP-A-61111221 in which an apparatus for aligning transported articles, e.g. fruit, is shown. The apparatus comprises paired left and right belt surfaces inclined like an inverted fan. The interval between the belt surfaces is gradually increased as it comes to the transfer terminal end, so that the delivered transported article is transferred in the same altitude as it is. The construction of the apparatus according this patent is simple and aligns the transported articles. However, the freedom of design of the shape of the transport surfaces, the hygiene in use of the belts and the lifetime of the transporting belts is limited.

Another device for positioning is know from EP 0 456 155; this device is specifically designed for transporting and packaging sausages. Described on the basis of the Figures of this patent publication are means for axially positioning the sausages. These means are formed by a pair of plates placed above a feed conveyor for the sausages. The plates are disposed vertically at an angle such that they together form a mouth opening through which the sausages are discharged. The plates serve to press the sausages not supplied axially relative to the mouth opening into the desired orientation. Such a contruction with positioning plates is structurally very simple but has the drawback that the contact between the plates and the (half-) products can result in undesired effects. Soft sausages can thus be deformed, meat remnants can remain on the plates, leading to contamination, and sausages lying too close together can be pressed together. The plates form a potential source of blockages. Another significant drawback is that the sausages according to this prior art are not always brought into the desired orientatio; the sausages are found in practice to also assume orientations differing from the axial.

The invention has for its object to provide a device and a method with which meat products can be oriented in a controlled manner, wherein the above stated drawbacks of the prior art do not occur, or only do so to a lesser extent.

These and other objects will be apparent to those skilled in the art.

SUMMARY OF THE INVENTION

The invention provides for this purpose a device for positioning separately supplied elongate meat products, comprising: two driven endless aligning conveyors running with the transport paths substantially parallel to each other, which transport paths together form a support for the meat products for transporting such that, at the position where the transport paths are mutually adjacent, they are in a lower position than when at a greater mutual distance. The downwardly converging inclined surfaces of the aligning conveyors being constructed from a plurality of substantially form-retaining segments which are fixed to endless support members provides the advantage that it provided a total freedom in the shape of the segments providing the contact surfaces with the elongated meat products. The freedom in designing the conveyor chute formed by the aligning conveyors together is very great here, without complex constructions being required to drive or bring about circulation of the individual aligning conveyors. The form of the contact surface with which the meat products come into contact (this contact surface being formed by the combined form of the aligning conveyors) results in the meat products displacing to the lowest possible position, which has the form of a chute created by the aligning conveyors. Through displacement to the lowest possible position (for instance by means of sliding, rolling or a combination hereof), the meat products, depending on the specific processing conditions, will already largely assume a successive axial orientation. The advantage of the device according to the invention is that the meat products do not undergo any forced movement herein, but take on the desired orientation only by means of gravitational force. This limits the chance of damage to the meat products and contamination of the transporting and positioning means. An advantage of using two aligning conveyors running partially parallel is that individually they can have a simple construction, while together they still provide the desired "conveyer chute" with a shape freely to be chosen. An endless conveyor with a conveyer surface of complex form requires solutions which are structurally much more difficult. Furthermore, also the freedom in the design of the shape of the transport path defined by the aligning conveyors increases.

Another advantage here is that this "conveyer chute" can be opened on the underside and between the form-retaining segments, so that possible contaminants such as loose meat portions can be discharged downward through the chute between the form-retaining segments. In order to prevent the meat products themselves also being able to fall downward in uncontrolled manner between the individual aligning conveyors, the distance between the aligning conveyors is preferably smaller than the smallest diameter perpendicularly of the longitudinal axis 30 through the elongate meat products. Another option is to exchange individual form-retaining segments in case of damage or for maintenance purposes. Yet another option is to change the configuration of the aligning conveyors by exchanging all, or only a part, of the form-retaining segments. This makes the device according the present invention more flexible in use than the prior art apparatus for aligning. Also, any belts or chains can thus be used as endless support members that are optimized without any restrictions due to the fact that they only have to support and to transport the individual form-retaining segments; the function of supporting the elongated meat products is dealt with by the individual form-retaining segments which can be optimized for their different support function. The present invention enables thus to provide a more solid and hygienic transporting and positioning device.

DESCRIPTION OF THE EMBODIMENTS OF THE INVENTION

Figure 1:
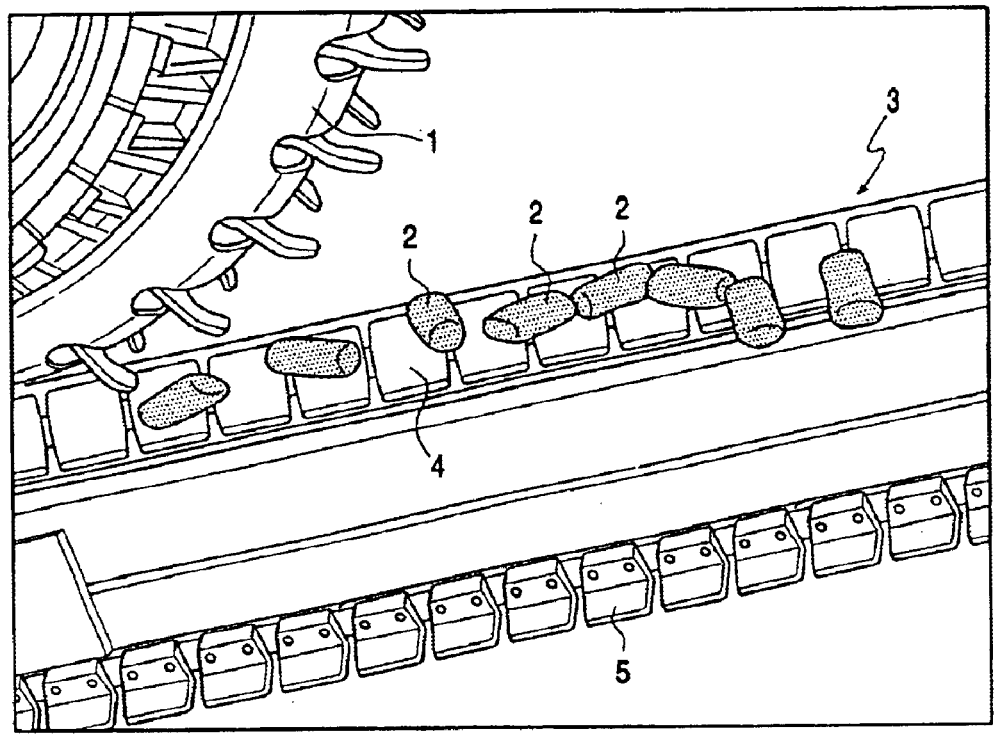
FIG. 1 shows a perspective view of a part of a crimper wheel with a conveyor belt 5 connecting thereto with which sausages are discharged according to the prior art.

In a preferred embodiment of the device according to the present invention, the aligning conveyors are constructed from a plurality of substantially form-retaining segments which are fixed to an endless support member. A simple endless conveyor belt or conveyor chain can thus be provided with separate segments which can have any desired form. The freedom in designing the conveyor chute formed by the aligning conveyors together is very great here, without complex constructions being required to drive or bring about circulation of the individual aligning conveyors.

In yet another preferred embodiment the device also comprises a discharge conveyor located at least partially under the transport paths of the aligning conveyors. After running through the transport path provided by the aligning conveyors, the meat products positioned by the aligning conveyors can thus be transferred simply to a subsequent conveyor, such as for instance a traditional conveyor belt, without having to be gripped, with all the drawbacks this entails.

The device can also comprise a feed member for elongate meat products which is located partially above the transport paths of the aligning conveyors. Due to the gravitational force the meat products for positioning can hereby be delivered in simple manner into the conveyor chute formed by the aligning conveyors. Gripping by external means is once again unnecessary here. An example of a feed member is a so-called crimper wheel with which a strand of sausages can be divided into separate sausages. A problem with the existing crimper wheels is that the separate sausages that are released do not all have the same orientation; this problem can be solved by means of the present invention.

A very advantageous embodiment variant of the device comprises aligning conveyors driven such that they are displaceable with a difference in speed. This can for instance be realized by applying separate motors for both the aligning conveyors, but it is also possible to apply a common drive engaging on both the aligning conveyors with two different transmissions. The important advantage of a difference in speed is that, due to the form of the conveyor chute, meat products which are not yet positioned axially (for instance sausages lying transversely of the direction of transport) will still take on the desired axial orientation owing to the difference in speed.

It is also advantageous when the transport paths of the aligning conveyors have a path section running substantially parallel to each other which transposes into a path section where the distance between the transport paths increases in the direction of transport. The meat products can thus drop downward between the aligning conveyors, provided that the mutual distance between the aligning conveyors increases sufficiently for this purpose. This provides the option of transferring the meat products in very controlled manner onto a lay-off means (such as for instance the above stated discharge conveyor) arranged under the aligning conveyors. Discharging of the positioned meat products between the aligning conveyors moreover forms an extra guarantee of axial positioning of the meat products.

The invention also provides a method for positioning separately supplied elongate meat products by the successive steps of: a) collecting successively supplied elongate meat products from a supply position by means of two aligning conveyors running with the transport paths substantially parallel to each other, b) displacing the aligning conveyors with the meat products supported thereby in the direction of transport, and c) unloading the positioned elongate meat products from the aligning conveyors through an opening between the transport paths of the aligning conveyors, which opening increases in the direction of transport. The advantages as already described above with reference to the device according to the present invention can be realized by means of this method. Additionally, the further step d) of displacing the aligning conveyors at different speeds during processing step b) provides the advantage of the meat products which are not yet initially positioned axially (for instance sausages initially lying transversely of the direction of transport) will still take on the desired axial orientation owing to the difference in speed. The aligning conveyors will exert limited external forces on the meat products in order to ensure the desired orientation; the meat product can displace in an unforced manner. In a preferred application of this method the transport paths of the aligning conveyors, owing to the form thereof, guide the meat products during processing step a) to a preferred orientation in axial direction. Without exerting external forces other than gravity, the meat products will thus position themselves in unforced manner. This is also possible during processing step b) when the transport paths of the aligning conveyors, owing to the form thereof, guide the meat products to a preferred orientation in axial direction during displacing of the meat products. When the aligning conveyors are also displaced at different speeds during processing step b), the aligning conveyors will exert limited external forces on the meat products in order to ensure the desired orientation, although also in this case the meat product can displace in unforced manner. Tests have shown that the difference in speed with which the aligning conveyors are displaced preferably amounts to less than 10% of the speed of the fastest-moving aligning conveyor.

For unforced unloading of the meat products the meat products can, in a preferred application, preferably be unloaded during processing step c) in that they drop downward between the two aligning conveyors.

FIG. 1 shows a part of a crimper wheel 1 with which a strand of sausages (not shown) is divided up into separate sausages 2. Sausages 2 are laid off onto a flat endless conveyor 3 by crimper wheel 1. A part of transport path 4 and a part of return path 5 of conveyor 3 are shown. As will be apparent from the illustration, sausages 2 are placed on conveyor 3 in rather random manner. It is however an object of the invention to place such sausages 2 on conveyor 3 one behind the other and axially relative to the direction of transport of conveyor 3.

Figure 2:
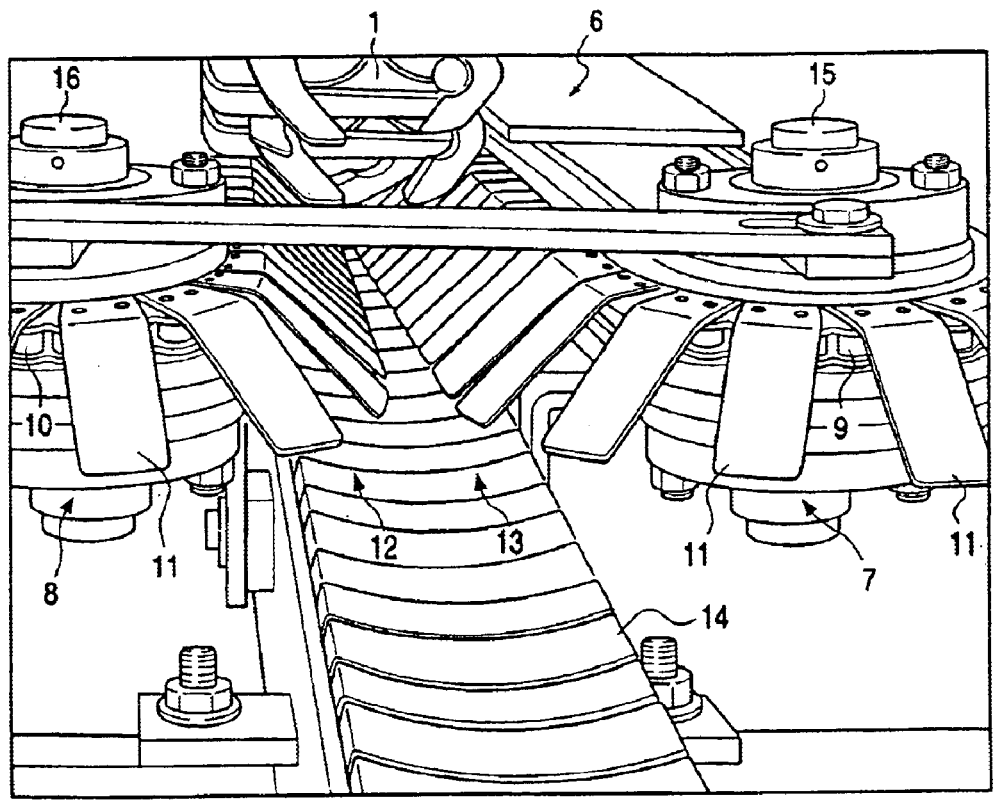
FIG. 2 shows a perspective view of a part of the device according to the invention.

FIG. 2 shows a part of a device 6 provided with two endless aligning conveyors 7, 8. Aligning conveyors 7, 8 both comprise an endless chain 9, 10 to which are fixed form-retaining and downward inclining segments 11. Transport paths 12, 13 of aligning conveyors 7, 8 run practically parallel to each other over a distance and thus form a kind of chute in which the meat products for positioning can be placed by a crimper wheel 1. During displacement of aligning conveyors 7, 8 the meat products will take on the desired orientation, whereafter they are laid off onto a discharge conveyor 14 co-displacing under transport paths 12, 13 of aligning conveyors 7, 8. Two rotation shafts 15, 16 of the respective endless aligning conveyors 7, 8 are also shown in this figure.

Figure 3:
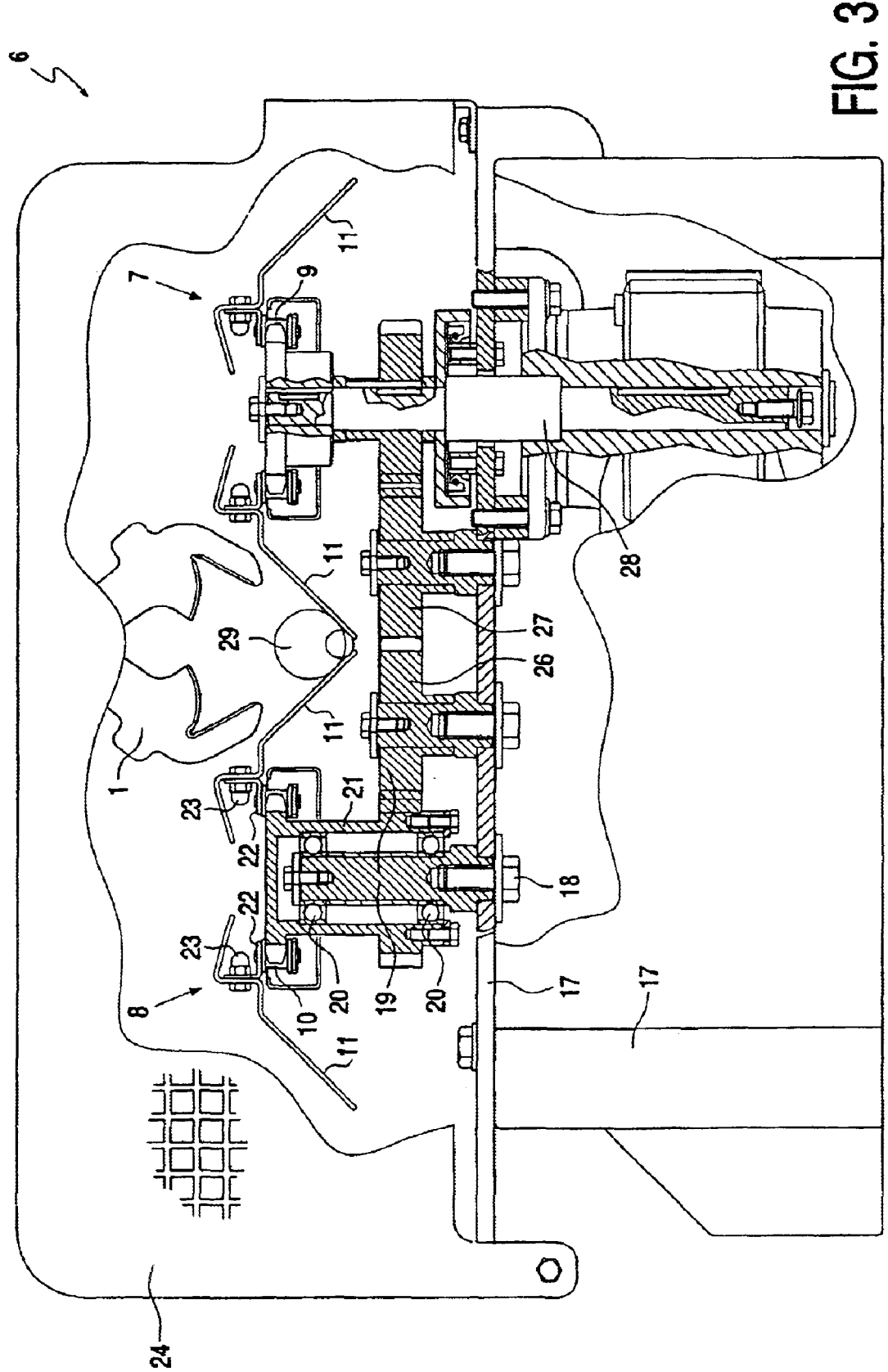
FIG. 3 shows a top view of the device according to the invention.

FIG. 3 shows device 6 in cross-section. A frame 17 carries a spindle 19 coupled to the frame with a bolt 18. Engaging on spindle 19 are bearings 20 which engage internally on a rotatable bush 21 which forms the guide for endless chain 10 of aligning conveyor 8. Right-angled brackets 22 are fixed to chain 10, which brackets carry the segments 11 fastened with a bolt connection 23. The aligning conveyor 8 is thus guided round spindle 19 by bush 21. Device 6 is screened from the environment by means of a grid plate 24; this serves to prevent, among other things, injury and malfunction. Toothed wheels 26, 27 synchronize the speeds of the two conveyors 7, 8. As already described above however, synchronization is not always desired; in specific conditions it is precisely a limited difference in transporting speed of the respective aligning conveyors 7, 8 which is sought. When a speed difference is aimed for, the mutual coupling of aligning conveyors 7, 8 will be absent or have a different transmission ratio. Owing to toothed wheels 26, 27 a single electric motor 28 will suffice in the shown example to drive the aligning conveyor 7.

It can be clearly seen that segments 11 of both aligning conveyors 7, 8 together form a chute in which the meat products 29, here shown schematically, can be transported.

Figure 4:
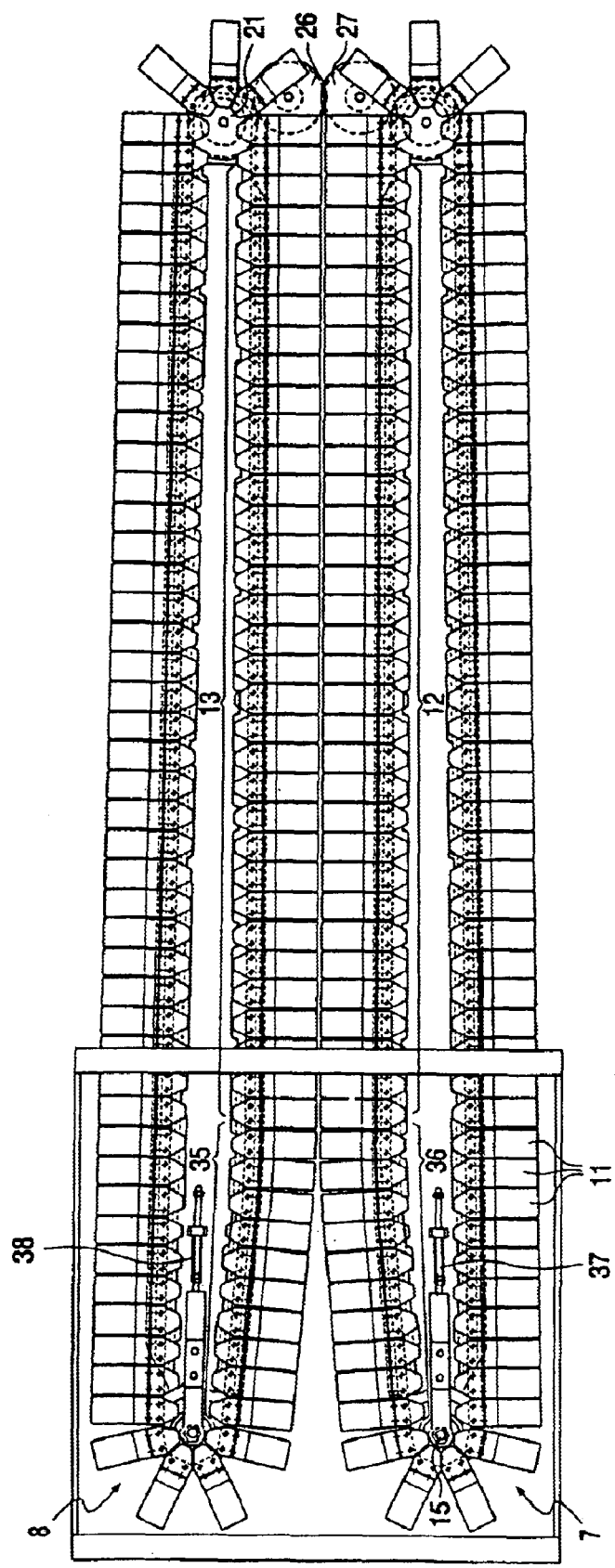
FIG. 4 shows a view of a cross-section through the device according to FIG. 3.

Finally, FIG. 4 shows device 1 in a top view. Aligning conveyor 8 is wholly the same as the first aligning conveyor 7, be it in a mirrored configuration. Transport paths 12, 13 of aligning conveyors 7, 8 run parallel to each other and thus form the above discussed chute-like construction. Lay-off paths 35, 36 connecting hereto are characterized in that the aligning conveyors 7, 8 have a continually increasing mutual distance in the direction of transport. The space hereby created between segments 11 makes the meat products drop downward between segments 11 to fall for instance onto a discharge conveyor 14 as shown in FIG. 2. It can also be seen that tensioners 37, 38 are arranged to hold the aligning conveyors 7, 8 tensioned.

It is therefore seen that this invention will achieve its stated objectives.

We claim:

1. A device for positioning separately supplied elongate meat products for use with a crimper, comprising:

two driven endless aligning conveyors running with transport paths substantially parallel to each other, which transport paths together form a support for the meat products for transporting such that, at the position where the transport paths are mutually adjacent, wherein the two driven endless aligning conveyors are constructed from a plurality of substantially form-retaining segments which are fixed to an endless support member, and wherein the substantially form-retaining segments are adapted to receive meat products from the crimper wherein the substantially form-retaining segments form a chute that aligns the meat products during the displacement of the conveyors.

2. A device as claimed in claim 1, wherein the distance between the aligning conveyors is smaller than the smallest diameter perpendicularly of the longitudinal axis through the elongate meat products.

3. The device as claimed in claim 1, wherein the device also comprises a discharge conveyor located at least partially under the transport paths of the aligning conveyors.

4. The device as claimed in claim 1, wherein the device also comprises a feed member for elongate meat products which is located partially above the transport paths of the aligning conveyors.

5. The device as claimed in claim 4, wherein the feed member for elongate meat products is formed by a crimper wheel.

6. The device as claimed in claim 1, wherein the aligning conveyors are driven such that they are displaceable with a difference in speed.

7. The device as claimed in claim 1, wherein the transport paths of the aligning conveyors have a path section running substantially parallel to each other which transposes into a path section where the distance between the transport paths increases in the direction of transport.

8. A method for positioning separately supplied elongate meat products comprising the successive steps of:

a) collecting successively supplied elongate meat products from a supply position by means of two aligning conveyors running with the transport paths substantially parallel to each other, b) displacing the aligning conveyors with the meat products supported thereby in the direction of transport, c) unloading the positioned elongate meat products from the aligning conveyors through an opening between the transport paths of the aligning conveyors, which opening increases in the direction of transport, and d) wherein the aligning conveyors are displaced at different speeds during processing step b).

9. The method as claimed in claim 8, wherein during processing step a) the transport paths of the aligning conveyors, owing to the form thereof, guide the meat products to a preferred orientation in axial direction during collection of the meat products.

10. The method as claimed in claim 8, wherein during processing step b) the transport paths of the aligning conveyors, guide the meat products to a preferred orientation in axial direction during displacing of the meat products.

11. The method as claimed in claim 8, wherein the difference in speed with which the aligning conveyors are displaced amounts to less than 10% of the speed of the fastest-moving aligning conveyor.

12. The method as claimed in claim 8, wherein the aligning conveyors unload the meat products during processing step c) in that they drop downward between the two aligning conveyors.

13. A device for positioning separately supplied elongate meat products comprising:

a) means for collecting successively supplied elongate meat products from a supply position by means of two aligning conveyors running with the transport paths substantially parallel to each other, b) means for displacing the aligning conveyors with the meat products supported thereby in the direction of transport, and c) means for unloading the positioned elongate meat products from the aligning conveyors through an opening between the transport paths of the aligning conveyors, which opening increases in the direction of transport, and d) means for displacing the aligning conveyors at different speeds during step b).

14. The device as claimed in claim 13, wherein during step a) the transport paths of the aligning conveyors, owing to the form thereof, guide the meat products to a preferred orientation in axial direction during collection of the meat products.

15. The device as claimed in claim 13, wherein during step b) the transport paths of the aligning conveyors, guide the meat products to a preferred orientation in axial direction during displacing of the meat products.

16. The device as claimed in claim 13, wherein the difference in speed with which the aligning conveyors are displaced amounts to less than 10% of the speed of the fastest-moving aligning conveyor.

17. The device as claimed in claim 13, wherein the aligning conveyors unload the meat products during step c) in that they drop downward between the two aligning conveyors.

* * * * *